United States Patent [19]

Ilius

[11] 4,425,681
[45] Jan. 17, 1984

[54] CLAMP CONSISTING OF A STEEL BAND LOOP

[76] Inventor: Siegfried K. Ilius, Carolus-Magnus-Str. 28, D-3538 Marsberg 1, Fed. Rep. of Germany

[21] Appl. No.: 314,884

[22] Filed: Oct. 26, 1981

[30] Foreign Application Priority Data

Oct. 31, 1980 [DE] Fed. Rep. of Germany ....... 3041106

[51] Int. Cl.³ ...................... B65D 63/02; F16L 33/22
[52] U.S. Cl. ........................................ 24/20 S; 24/484
[58] Field of Search ............. 24/20 S, 20 R, 20 CW, 24/256, 27

[56] References Cited

U.S. PATENT DOCUMENTS

| | | | |
|---|---|---|---|
| 1,379,476 | 5/1921 | Parr | 24/20 CW |
| 2,629,908 | 3/1953 | Keck | 24/20 S |
| 2,874,430 | 2/1959 | Coldren | 24/256 |
| 3,189,961 | 6/1965 | Heller | 24/20 CW |
| 3,317,966 | 5/1967 | Gildone | 24/27 |
| 3,867,055 | 2/1975 | Wooden | 24/20 S |
| 4,299,012 | 11/1981 | Oetiker | 24/20 LS |
| 4,315,348 | 2/1982 | Oetiker | 24/20 CW |

FOREIGN PATENT DOCUMENTS

| | | | |
|---|---|---|---|
| 1575159 | 1/1970 | Fed. Rep. of Germany | 24/20 CW |
| 1177161 | 3/1959 | France | 24/256 |
| 2470276 | 5/1981 | France | 24/20 R |
| 1560606 | 2/1980 | United Kingdom | 24/20 R |

*Primary Examiner*—John J. Wilson

[57] ABSTRACT

A steel band loop clamp is disclosed having a first end with a raised abutment and tangentially extending end portion, and a second end adapted for engagement against the raised abutment to hold the clamp in a prestressed open position. A closed circumferential slot terminates partially along the raised abutment and extends partially around the steel band loop, for accepting into engagement therewith the second end of the closed band loop when the clamp is engaged into a closure position.

5 Claims, 6 Drawing Figures

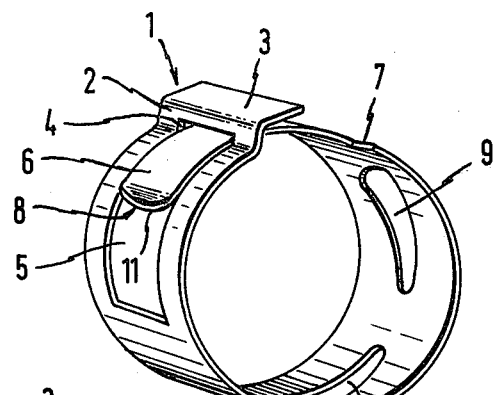
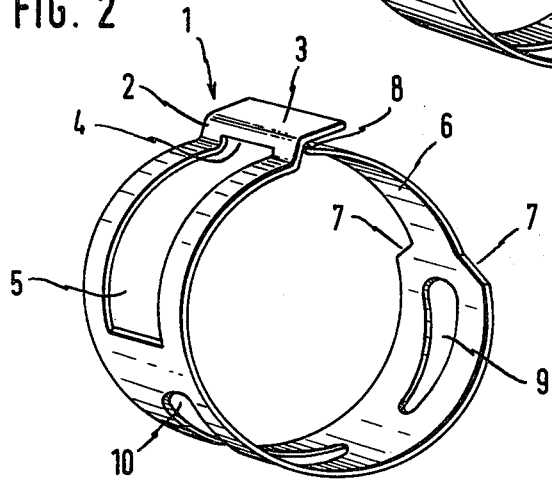
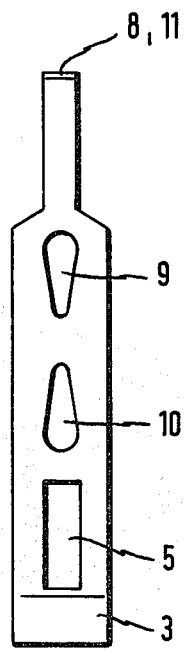
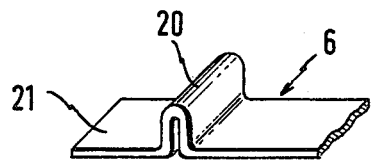
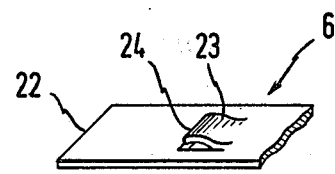
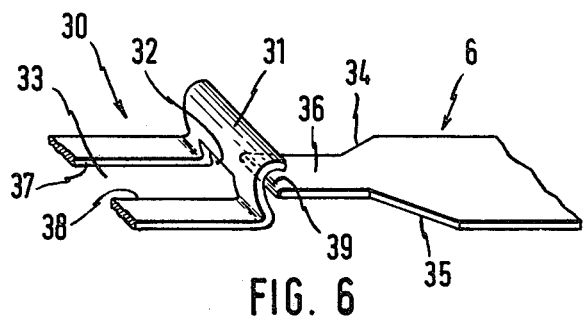

CLAMP CONSISTING OF A STEEL BAND LOOP

The invention relates to a clamp consisting of a steel band loop where the free end of said clamp engages at least in clamping position an opening in the vicinity of the other end which is provided with an abutment.

A clamp which is known from the U.S. Pat. No. 2,629,908 and consists of a wire, the free wire ends are provided with engaging means so that in open position of the clamps they are held against each other. Since in open position there is not a guidance of the two free wire ends, there is the danger that the two ends undo arbitrarily their bracing position.

The invention has been based on the problem to provide a clamp of the initially mentioned type which, while being prestressed, without any tool can be pushed or drawn onto the tube, for example; then it is to be brought, by simple operation, into the final clamping position.

The problem is solved by providing the end which includes the abutment with an approximately tangentially extending end portion and by constructing the end as a constant support surface for the free end of the prestressed loop, wherein the tangentially extending end portion overlaps the free end of the prestressed loop at all closure positions.

According to a preferred embodiment of the invention, the tangentially extending edge portion is rounded; at a distance from the free end, there can be provided a folding, a bead, a bulge, a punched-out portion or a rivet head or the like.

The abutment is preferably provided with an opening which as an extension is in the form of a slot; this opening can extend in an approximately radial plane at most over half the abutment.

The drawing shows exemplifying embodiments of the invention; they will be explained hereinafter in more detail.

FIG. 1 shows an oblique view onto an embodiment in clamping position, the object to be clamped being not shown;

FIG. 2 shows the same embodiment in transport position;

FIG. 3 shows a sheet bar for manufacturing the above mentioned embodiment;

FIG. 4 shows a detail of a modified embodiment;

FIG. 5 shows a detail of another embodiment; and

FIG. 6 shows a detail of another embodiment in a position which is similar to that of FIG. 2.

A clamp 1 which is made of a spring steel band having a thickness of about 0.5 mm and a width of about 15 mm and which preferably is to be used as a tube clamp at the one loop end has an approximately radially extending portion 2 and approximately at right angles thereto a tangentially extending end portion 3.

The radially extending portion 2 which is constructed as a support surface is provided with an opening 4 having a height of 1.5 mm approximately; the opening 4 is in the loop elongated by a corresponding opening 5 of the same width.

The opposite loop end has a width which is adapted to the openings 4 and 5 and then via chamfers 7 verges over into the full band width. The free end 8 of the loop end 6 is radially bent outwardly or at angles. In order to increase the elasticity of the band, there are provided therein openings 9 and 10.

FIG. 2 shows the same clamp in transport position; in this position, it is pushed or drawn onto the tube.

As can be seen from FIG. 2, the bent or cranked end 8 of the loop end 6 rests against the inner side of the portion 2 above the opening 4. The free edge 11 of the cranked end of the loop end 6 rests against the underside of the end portion 3. Since the clamp is subjected to quite a great prestress, the snap-in position of the two loop ends cannot automatically be released. If however the clamp for example is pushed onto a tube, a tool, for example a screw driver, is used to exert a pressure in the region of the cranked portion 8, the edge of the end portion 3 serving as an abutment; it is also possible to release the prestress by means of the screw driver by turning the screw driver about its own axis after it has been inserted in the cranked portion.

The pressure—for example by the screw driver—causes the free end 8 of the loop end 6 to move into the opening 4 and to shoot forward until the desired clamping position about the tube is achieved. The free end 8 can then, as already noted, for example assume the position shown in FIG. 1.

For the possibly required pulling off of the clamp, it is only necessary to approach the two loop ends to each other, for example by pliers.

In the example of the embodiment shown in FIG. 4, the loop end 6 is already constructed such as in case of the embodiment of FIGS. 1 to 3. The end portion of the loop end 6, which portion is of small width, has a fold 20 which has been pressed together and which in transport position and until it is used rests against the inner side of the portion 2, whereas the free end 21 of the loop end 6 projects into the opening 5. In this embodiment, any damages of the tube during pressing down of the loop end 6 are substantially avoided since the screw driver with its tip does not come into contact with the tube even if it would slide over the fold 20.

The loop end 6 as shown in the embodiment of FIG. 5 is also constructed such that during release of the tension of the clamp the screw driver practically cannot cause any damage of the tube. A bead 23 bulged out of the loop end 6 at a distance from the end edge 22 with its sharp edge 24 in transport position rests against the inner side of the portion 2. For releasing the tension, one presses down the bead 23 be means of a screw driver so that—as mentioned above—the loop end 6 is permitted to shoot forward.

According to the embodiment as shown in FIG. 6, the one loop end 30 is provided with a dished end portion 31; there is provided in this end portion an opening 32 which corresponds to the opening 4 and verges into the opening 33. The loop end 6 is provided with chamfered portions 34, 35 and a pointed round tongue 36 having a reduced width; the width of this tongue 36 is adapted to the opening 33 so that said tongue extends through the lateral edges 37, 38 of the opening 33 in clamping position.

The front edge 39 of the loop end 6 is rounded in accordance with the concave rounding of the end portion 31. This rounding which is adapted to the concave rounding guarantees that the loop end 6 is prevented from sliding automatically or at only a slight pressure onto the loop end 6 into the opening 32.

The height of the opening 32 is not as much as half of the concave rounding of the end portion 31 so that when a pressure is exerted onto the tongue 36, prior to the shooting forward of the front edge or rounded edge 39 into the opening 32 there has to be overcome a small degree of prestress, this resulting in that the loop end 6 prior to the shooting into the opening 32 in the drawing moves slightly to the right.

What I claim is:

1. In a clamp constructed in the form of a closed band loop having a prestressed closure position wherein the respective ends of said closed band loop become engaged, the improvement comprising one of said ends having an approximately radially extending offset portion joined to an approximately tangentially extending end portion; a circumferential slot opening extending partially around said loop proximate said one end, said slot terminating in said radially extending offset portion; said other end of said loop having a narrowed portion sized for fitting in circumferential relationship in said slot beneath said tangentially extending end portion.

2. The clamp of claim 1, wherein said other end of said loop further comprises a raised projection adapted for engagement against said radially extending offset portion.

3. The clamp of claim 1, wherein said tangentially extending end portion overlaps said loop other end in all closure positions of said loop.

4. The clamp of claim 1, wherein said slot terminates no more than half the distance along said radially extending offset portion.

5. A clamp formed from a steel band loop wherein a first end thereof is constructed as an abutment for the second end thereof to hold said loop in a prestressed nonuse position, wherein said abutment comprises an approximately radially extending portion adjacent an approximately tangentially extending end portion, and further comprising a circumferential slot terminating in said radially extending portion of said abutment, said slot extending around a portion of said loop; said second end being narrowed and adapted for insertion into said slot, said second end further comprising a raised portion adapted for seating against said first end approximately radially extending portion.

* * * * *